United States Patent [19]

Gorman

[11] Patent Number: 4,904,130
[45] Date of Patent: Feb. 27, 1990

[54] CUTTING TOOLS WITH DEPTH INDICATION

[76] Inventor: Jeremy W. Gorman, 1095 Middlebury Rd., Middlebury, Conn. 06762

[21] Appl. No.: 295,527

[22] Filed: Jan. 11, 1989

[51] Int. Cl.[4] ............ B23B 51/02; B27B 33/08; B23D 61/02
[52] U.S. Cl. .................... 408/16; 83/835; 408/116; 408/227
[58] Field of Search ............ 83/522, 676, 835; 30/505; 408/16, 116, 199, 226, 227, 228, 229, 230

[56] References Cited

U.S. PATENT DOCUMENTS

| 88,649 | 4/1869 | Machauer | 83/835 |
|---|---|---|---|
| 117,237 | 7/1871 | Abbott | 408/229 |
| 850,480 | 4/1907 | Jernigan | 30/505 |
| 1,984,839 | 12/1934 | Murray | 408/226 |
| 2,219,605 | 10/1940 | Turkel | 408/204 |
| 3,349,647 | 10/1967 | Stan | 408/16 |
| 4,527,449 | 7/1985 | Sydlowski et al. | 408/16 |

FOREIGN PATENT DOCUMENTS

| 657267 | 5/1929 | France | 408/16 |
|---|---|---|---|
| 88/01557 | 3/1988 | PCT Int'l Appl. | 83/835 |

Primary Examiner—Daniel Howell
Attorney, Agent, or Firm—Robert S. Smith

[57] ABSTRACT

A drill bit, circular saw blade, milling head or other cutting tool on which are disposed a repeating series of color coded marks spaced uniformly at small predetermined increments so that they can be seen and distinguished while the tool is in use and can therefore be used as depth gauges for cutting, shaping or drilling to a desired depth.

15 Claims, 2 Drawing Sheets

CUTTING TOOLS WITH DEPTH INDICATION

BACKGROUND OF THE INVENTION

Users of cutting tools, and most particularly power tools, frequently have need of cutting or drilling their work to a precise predetermined depth. Slots, holes, bevels and dadoes often are useful only if they have a precise depth. Depth gauges exist for the measurement of these cuts, and stops and collars also exist which can be mounted on the cutting tool to prevent its penetration beyond the desired depth. Each of these is useful, and widely used by professional as well as amateur workmen. The problem of assembling these stops or collars, and changing them each time a new depth is desired, can be painstaking and time consuming, and if frequent changes are necessary, are a source of error. Placing tapes or pencil marks on the tools often is less successful, since the tapes move, or wear out, and the pencil marks usually cannot be seen while the tool is in motion.

SUMMARY OF THE INVENTION

It has now been found that the objects of the invention may be attained in cutting apparatus that includes a series of colored stripes spaced at precise intervals, such as ¼ inch, or ½ centimeter. The stripes can, if carefully placed, be seen and used while the tool is in motion, and can eliminate the need for gauges, stops or collars. These stripes are ordinarily not positioned on the flutes of a drill bit or other cutting surface of a cutting tool where they will wear off as soon as cutting begins, but in the grooves or other location spaced from the cutting edges, so as not to come into direct contact with the work being cut. It will be understood that in some embodiments the mark may be positioned on the cutting surfaces because that is essential to provide the desired depth of cut indication. On a circular saw blade, these stripes can be concentric circles which may be spaced one quarter of an inch apart. Since the saw blade has a kerf which cuts a slightly wider groove than the thickness of the blade itself, these stripes are protected and will not readily wear off. The use of hard curing metal bonding paint can further extend the life of these useful gauge marks.

Preferably, the colors should follow a regularly repeating pattern. For example, in one embodiment of the invention every inch mark is white, every quarter inch mark is a second color, every half inch mark is a third color, and every three-quarter inch mark is a fourth color.

This pattern lets the user know instantly just how deep the drill is drilling, the saw is sawing, or the cutter is cutting. These colors can also serve as a code for the type of tool so marked. For example, on a wood bit, the pattern may be white, red, blue and yellow. On a high speed metal drill, the pattern could be white, orange, green and black. In this manner, the type of tool is known even if it gets misplaced and separated from its adjacent sized tools of the same type.

These stripes or marks can be used on a wide variety of cutting tools, including circular hole cutters, milling heads, spade augers, twist drills, or helical augers. It is important that if these tools are made for a wide variety of purposes, each purpose should be associated with a different colors. If, for example, the ¼, ½, ¾, and 1 inch marks are red, black, yellow and white respectively, that same sequence of colors appears in a second set disposed respectively at 1¼, 1½, 1¾ and 2 inches. Thus, all ¼ inch marks are the same color, all ½ inch marks are the same color, all ¾ inch marks are the same color and all one inch marks are the same color. Of course the color codes can serve additional purposes also. Manufacturers make drills, saws, milling heads and the like for different purposes. There are wood bits, soft metal bits, high speed bits etc. The color sequence in the wood bit could be different from that of the high speed drill sequence. Thus if the tools get intermixed in a tool box, they can easily be distinguished by the colors of the gauging stripes.

Other color combinations may be utilized without departing from the spirit of the invention. For example, the color sequences may be the sequences utilized for marking electrical resistors.

BRIEF DESCRIPTION OF THE DRAWING

The invention will be better understood by reference to the accompanying drawing in which.

DESCRIPTION OF THE PREFERRED EMBODIMENTS

Figure 1:
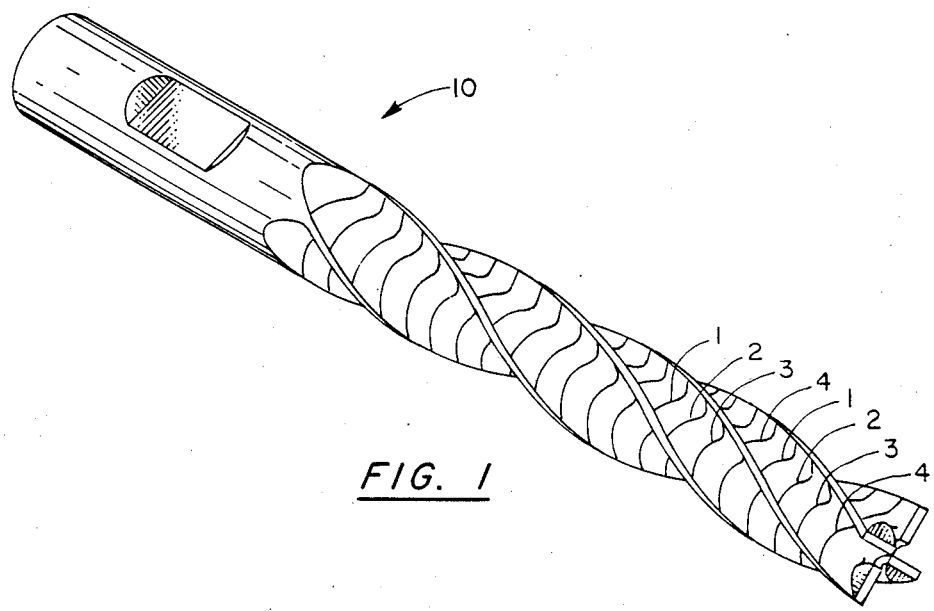
FIG. 1 is a perspective view of a twist drill showing the gauging stripes in accordance with one form of the invention.

FIG. 1 shows a twist drill 10 and illustrates the gauging stripes 1, 2, 3, 4 and an axially adjacent set 1, 2, 3, 4 in the grooves of the drill rather than on the cutting surface. As the drill 10 penetrates the work piece, a stripe number 4 will meet the work surface when the drill 10 has penetrated to a depth of ¼ inch. The drill operator now knows that the hole is ¼ inch deep. The stripes are not on the cutting surface, so they will not be worn away by the work being drilled. In this drawing, there are two gauging stripes numbered 4, to indicate that the color of these two stripes is the same. If the drilling is continued, a stripe 3 will then disappear, indicating that the hole is now ½ inch deep. There are two gauging stripes numbered 3, to indicate that these strips are the same color, but not the same as stripes 4, 2, or 1. In this embodiment, the spacing between the exact center of each adjacent gauging stripes 1, 2, 3, 4 is exactly ¼ inch. (It will be understood that the terminology herein that particular marks are a given distance apart actually refers to the spacing between the center of the marks because the marks have a finite width.) The spacing between gauging stripes of the same color, such as 4, 4 is thus one inch.

Consequently, when the second stripe 4, which may be red, penetrates the work, the operator knows that the hole (not shown) is 1¼ inches deep. This pattern will continue up the shaft of the drill, so that red gauging stripes are ¼, 1¼, 2¼ and 3¼ inches from the end of the drill. Only two such set of stripes are shown in the drawing for simplicity. Gauging stripes are numbered 1, which could be white, are 1, 2, 3, and 4 inches from the end of the drill, telling the operator that hole depth is 1, 2, 3, or 4 inches deep when the "white" gauging stripe meets the surface of the work. The selection of color is insignificant, except that they be enough different to be distinguished while the drill is rotating. In this instance, 4 colors were used. There could be three, or two or some other number.

In metric embodiments, the gauging stripes, for example, may be ½ centimeter apart and only two colors need be used.

Figure 2:
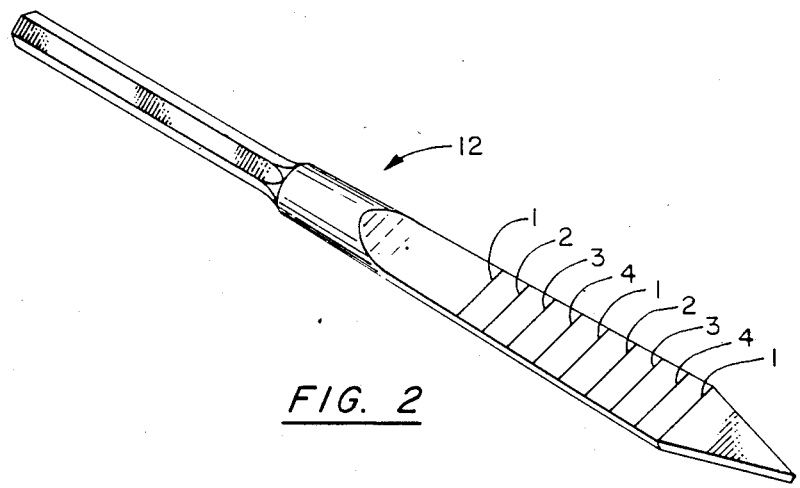
FIG. 2 is a perspective view of a spade auger in accordance with one form of the invention.

FIG. 2 shows a spade auger 12 in accordance with one form of the invention that is provided with a similar pattern of gauging stripes. The spade auger is similarly provided with axially spaced gauging stripes 1, 2, 3, 4, and another axially spaced set of similarly axially spaced colored stripes 1, 2, 3, 4. There are two stripes of each color, the numbers indicating the color of the stripe. As in FIG. 1, these gauging stripes are not on the cutting edge of the spade auger, but on the flat surface, so that they will not wear away as the auger penetrates the work. Again stripes 1, 1 are precisely 1 inch apart, while adjacent stripes of different colors are ¼ inch apart. Even when rotating these stripes are easily visible to the operator who can use them as depth gauges. When the second stripe marked 3 is at the work surface, the operator knows that the tip of the spade auger has penetrated the work exactly 1½ inches.

Figure 3:
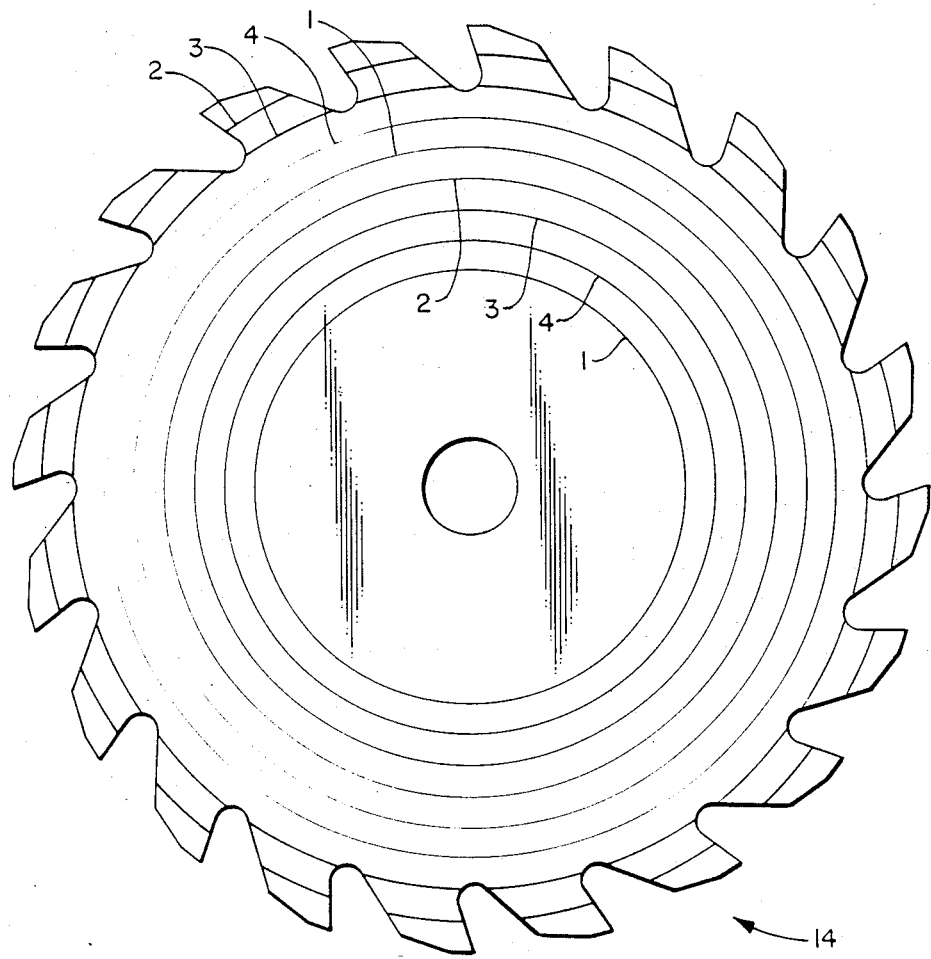
FIG. 3 is circular saw blade provided with the gauging stripes in accordance with one form of the invention.

FIG. 3 illustrates a circular saw blade in accordance with another form of the invention which has radially spaced gauging arcs or stripes numbered to indicate repeating colors. Since most circular saw blades have a set in the kerf, the cut in the work is slightly wider than the blade is thick. This has traditionally been done to prevent the saw from binding in the work as it cuts. For this reason, the gauging stripes 1, 2, 3 and 4 will not be worn away by the work as the saw cuts. Since the gauging stripes as shown are concentric with the saw center, and go completely around both sides of the saw blade, they can easily be seen as the saw rotates. When stripe 2 is at the work surface, the depth of the cut is ¼ inch, since in this drawing the stripes are precisely ¼ inch apart. There are two gauging stripes 2, indicating that they are the same color. When the second gauging stripe 2, which may be black, is at the surface, the operator know that the saw cut is 1¼ inches deep. The stripes easily let the the operator knows that the saw cut within ⅛ inch, since it is not difficult to determine when half of the space between two marks is at the surface of the work. Each gauging stripe is colored, and like colors are given like reference numerals in the figure. There is no significance to the colors except that they be easily distinguishable while the saw blade is rotating. These colors may be altered by the manufacturer to code the type of saw blade. In addition, there need not be 4 colors as shown in this drawing, but 2, 3, or 6 may be used. Four colors spaced at ¼ inch are provided in the preferred embodiment. Similarly, two colors spaced at ½ centimeter is a particularly advantageous embodiment for a metric saw blade.

The use of tool mounted gauging stripes as described in this invention is simple. The purpose of the stripes is to let the operator know precisely how far his tool has penetrated the work piece. These gauging stripes as shown in the drawings and described above are a directly visible method of letting the operator know the depth of his cut. They are so designed and placed that the operator can see them while the tool is in use. These gauging stripes on drill bits can easily be seen while drilling is underway. On circular saws this is also true, particularly on a radial arm saw. Even on a table saw or on a hand held saw, the blade can be brought to the correct depth against the table or the shoe before the cut is started, and can be checked in motion before the first cut is made. They can even be adjusted while the blade is rotating. The purpose of the color codes is to ease the indexing of the depth. All standard measuring increments, such as an inch, or a centimeter, are ordinarily the same color. Intermediate fractions of these increments, such as ¼ inch, or ½ centimeter are different colors in a repeating pattern, so that the operator can tell his depth at a glance. All colors are spaced an even increment from the same color mark in the next cycle, but are different from the adjacent color.

Having thus described my invention I claim:

1. A cutting tool apparatus for use with metal, wood, plastic, ceramic, masonry or other materials which comprises;
   a cutting surface;
   a support surface for holding said cutting surface;
   a plurality of indicia disposed on said support surface for indicating the depth of said cutting surface in an associated work piece, the distance between adjacent indicia being uniform;
   said plurality of indicia being arrayed in at least two spaced sets, each set consisting of a plurality of indicia of a plurality of colors, and each of the sets having the same colors.

2. The apparatus as described in claim 1 wherein:
   each set has the same colors arranged in the same order.

3. The apparatus as described in claim 2 wherein:
   the distance between adjacent indicia is a fractional part of a standard unit of measurement.

4. The apparatus as described in claim 3 wherein:
   said colors are selected from the group consisting of white, black, silver, gold, brown, red, green and yellow.

5. A circular saw blade for use with metal, wood, plastic, ceramic, masonry or other materials which comprises:
   a cutting surface;
   a support surface for holding said cutting surface;
   a plurality of indicia disposed on said support surface for indicating the depth of said cutting surface in an associated work piece, the distance between adjacent indicia is uniform, said indicia being arrayed in at least two spaced sets, each set consisting of a plurality of indicia of a plurality of colors, and each of the sets having the same colors.

6. The apparatus as described in claim 5 wherein:
   each set has the same colors arranged in the same order.

7. The apparatus as described in claim 6 wherein:
   the distance between adjacent indicia is a fractional part of a standard unit of measurement.

8. The apparatus as described in claim 7 wherein:
   said colors are selected from the group consisting of white, black, silver, gold, brown, red, green and yellow.

9. A twist drill for use with metal, wood, plastic, ceramic, masonry or other materials which comprises;
   a cutting surface;
   a support structure for holding said cutting surface;
   a plurality of indicia disposed on said support surface for indicating the depth of said cutting surface in an associated work piece, the distance between adjacent indicia being uniform,
   said indicia being arrayed in at least two sets, each set consisting of a plurality of indicia of a plurality of colors, and each of the sets having the same colors.

10. The apparatus as described in claim 9 wherein:

each set has the same colors arranged in the same order.

11. The apparatus as described in claim 10 wherein:
the distance between adjacent indicia is a fractional part of a standard unit of measurement.

12. The apparatus as described in claim 11 wherein:
said colors are selected from the group consisting of white, black, silver, gold, brown, red, green and yellow.

13. A spade auger for use with metal, wood, plastic, ceramic, masonry or other materials which comprises;
a cutting surface;
support structure for holding said cutting surface;
a plurality of indicia disposed on said support surface for indicating the depth of said cutting surface in an associated work piece, the distance between adjacent indicia being uniform,
said indicia being arrayed in at least two spaced sets, each set consisting of a plurality of indicia of a plurality of colors, and each of the sets having the same colors.

14. The apparatus as described in claim 13 wherein:
the distance between adjacent indicia is a fractional part of a standard unit of measurement.

15. The apparatus as described in claim 14 wherein:
said colors are selected from the group consisting of white, black, silver, gold, brown, red, green and yellow.

* * * * *